United States Patent [19]

Kowal et al.

[11] E Re. 30,940

[45] Reissued May 25, 1982

[54] FLARING TOOL

[75] Inventors: Leonard J. Kowal, Prospect Heights; Edward N. Garvey, Schaumburg, both of Ill.

[73] Assignee: Gould Inc., Rolling Meadows, Ill.

[21] Appl. No.: 112,523

[22] Filed: Jan. 16, 1980

Related U.S. Patent Documents

Reissue of:

[64] Patent No.: 4,068,515
Issued: Jan. 17, 1978
Appl. No.: 767,642
Filed: Feb. 7, 1977

[51] Int. Cl.[3] ..... B21D 19/16

[52] U.S. Cl. ..... 72/115; 72/125; 72/318

[58] Field of Search ..... 72/DIG. 9, 115, 116, 72/117, 125, 316, 317, 318, 370; 285/382, 382.5, 382.4

[56] References Cited

U.S. PATENT DOCUMENTS

| | | | |
|---|---|---|---|
| 1,795,358 | 3/1931 | Arndt | 72/125 |
| 1,804,814 | 5/1931 | Schultis | 285/382.5 |
| 2,117,543 | 5/1938 | Corrigan | 72/317 |
| 2,242,831 | 5/1941 | McIntosh | 72/317 |
| 2,323,912 | 7/1943 | Johnson | 285/382 |
| 2,430,168 | 11/1947 | Graham | 72/317 |
| 2,545,168 | 3/1951 | Richardson | 285/382.5 |
| 2,662,575 | 12/1953 | Wolcott | 72/116 |
| 2,774,408 | 12/1956 | Franck | 72/DIG. 9 |
| 3,052,279 | 9/1962 | Collin et al. | 72/317 |
| 3,109,479 | 11/1963 | Wolcott | 72/DIG. 9 |

FOREIGN PATENT DOCUMENTS

| | | | |
|---|---|---|---|
| 1210847 | 11/1970 | United Kingdom | 72/370 |

*Primary Examiner*—Lowell A. Larson
*Attorney, Agent, or Firm*—Wegner, Stellman, McCord, Wood & Dalton

[57] ABSTRACT

A manually operable tube flaring tool for providing a partial flare in the end of a deformable tube. The tool includes a flaring head defining an annular flaring surface and a cylindrical pilot portion projecting axially from the flaring surface to be received in the tube end for guiding the flaring surface axially against the distal end of the tube during the flaring operation. The tool further includes a support for fixedly positioning the tube end coaxially adjacent the flaring surface of the flaring head. The support defines an improved recess configuration providing a controlled buckling of the tube end by the forceful engagement therewith of the flaring surface wherein the buckled tube end defines preselected frustoconical inner and outer portions. The support may further define a conventional single flare recess opposite the partial flare recess whereby the tube may be used selectively to provide either of the partial or single flare flaring operations. The tube clamp may be defined by one leg of the U-shaped body and a cooperating clamp block movably carried by the body and adjustably positioned by a threaded member threaded through the other leg of the body.

17 Claims, 8 Drawing Figures

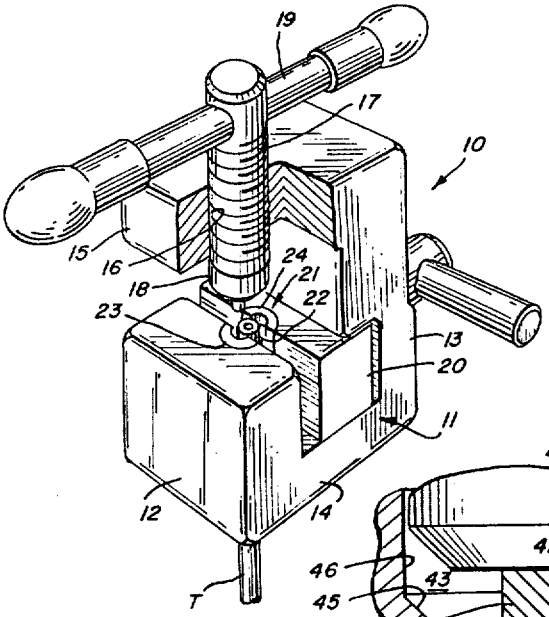
FIG. 1
FIG. 2
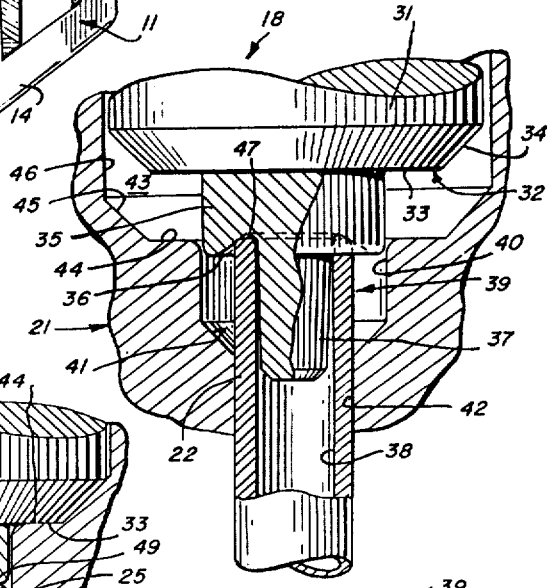
FIG. 3
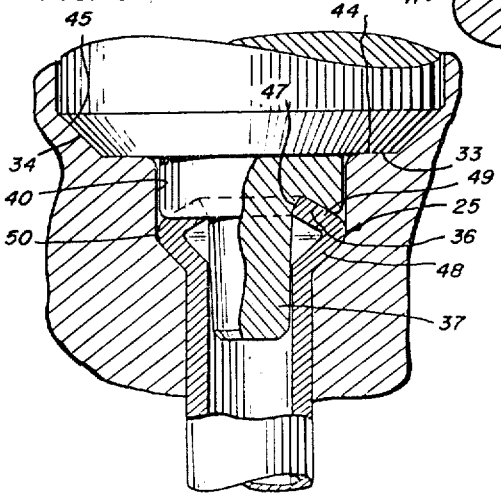
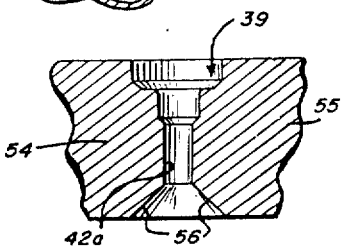
FIG. 8

FLARING TOOL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to manually operable flaring tools and in particular to flaring tools for providing double flares.

2. Description of the Prior Art

In one conventional form of flaring tool, a flaring cone is urged into the distal end of the tube so as to flare the distal end frustonically outwardly. The flaring operation is controlled so as to arrange the flared end accurately to conform to the seating surface of the fitting to which the flared tube is to be connected.

In certain applications, it is desirable to fold over the flare so as to provide double thick walls. Illustrations of such double flaring tools are illustrated in U.S. Pat. Nos. 2,370,089, 2,553,813, and U.S. Pat. No. Re.24,325, each of which patents is owned by the assignee hereof.

Other patents owned by the assignee hereof illustrating other forms of flaring tool structures are those of Kowal et al U.S. Pat. Nos. 3,576,335, Strybel 3,849,881, and Strybel 3,913,364.

SUMMARY OF THE INVENTION

The present invention comprehends an improved manually operable tool which provides a partial double flare in the end of a deformable tube, permitting the completion of the formation of the double flare by the fitting elements themselves as an incident of making up of the fitting.

In the illustrated embodiment, the tool deflects the tube end to a preselected partial double flare configuration by effecting a controlled buckling of the tube end within a novel recess in the tube support by a novel flaring head acting against the distal end of the tube.

More specifically, the tube flaring tool of the present invention includes a flaring head defining an annular flaring surface and a cylindrical pilot portion projecting axially from the flaring surface to be returned in the tube end for guiding the flaring surface axially against the distal end of the tube, a support for fixedly positioning the tube end coaxially adjacent the flaring surface, the support defining a cylindrical recess coaxially confronting the flaring surface and including an outer right circularly cylindrical portion, an inner frustoconical, outwardly widening portion opening coaxially into the outer portion, and an innermost tube clamping right circularly cylindrical portion, and force transmitting means for forcibly urging the flaring head axially inwardly against the distal end of the tube secured by the clamping portion, the angularity of the frustoconical surface being preselected to allow the tube end to buckle outwardly to have an inner portion abut the frustoconical surface of the support and an outer portion adjacent the distal end abut the flaring surface of the flaring head.

In the illustrated embodiment, the head flaring surface is frustoconical widening inwardly coaxially toward the support recess.

In one embodiment, the flaring surface comprises a planar surface perpendicular to the axis of the pilot portion.

The head may define a radially outer cylindrical surface slidably receivable in the outer portion of the support recess for further guiding of the head in the forming operation.

The head and support may include cooperating stop means for limiting the axial inward movement of the head.

The angular arrangement of the different surfaces of the head and recess are accurately preselected to provide a preselected partial buckled tube end for accurate fit in the tube fitting in which the flared tube end is to be used so as to permit a completion of the tube flare to be accurately effected as an incident of threaded make-up of the fitting in the normal manner.

The diameter of the outer cylindrical surface of the support recess is accurately preselected to control the outer diameter of the partial flare.

In one form, the force transmitting means comprises threaded means for threadedly advancing the flaring head against the tube end. In another form, the force transmitting means comprises a punch having a striking surface opposite the flaring head portion.

The invention further comprehends the provision of a tube flaring tool structure wherein the body comprises a U-shaped body defining spaced legs and an intermediate bight portion. Fixed means are provided on one of the legs to define one half portion of a tube clamp, and a clamp block is movably positioned in the space between the legs and defines the other half portion of the tube clamp. Means are provided for forcibly urging the clamp block toward the one leg so as to effectively clamp a tube end between the clamp block and one leg in the half tube clamp portions thereof.

The support is adapted for use with a flaring head as discussed above adapted to make only a partial flare in the end of the tube held in the novel tube clamp structure.

Thus, the tool structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view with portions broken away illustrating one embodiment of a manually operable tube flaring tool embodying the invention;

FIG. 2 is a fragmentary enlarged diametric section illustrating a first step in the forming of the partial double flare in the tube end by the flaring tool;

FIG. 3 is a fragmentary section illustrating the arrangement of the tube end and tool as upon completion of the forming of the partial double flare thereby;

FIG. 8 is a fragmentary section illustrating a modified form of support for use in the tube flaring tool of the invention.

DESCRIPTION OF THE PREFERRED EMBODIMENTS

Figure 4:
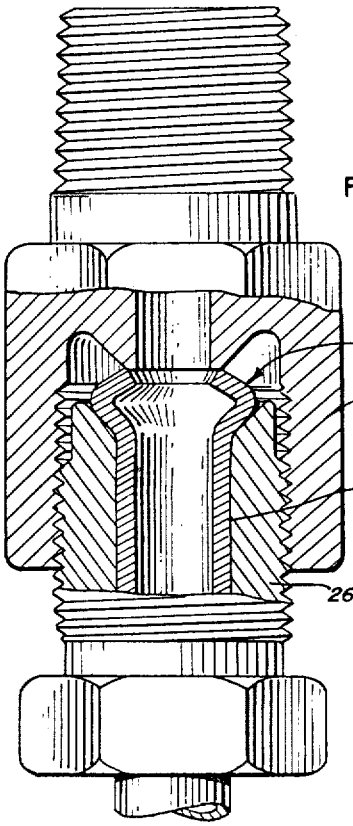
FIG. 4 is a fragmentary view partially in section illustrating the disposition of the tube end with the partial double flare formed therein mounted within a partially made-up fitting.
Figure 6:
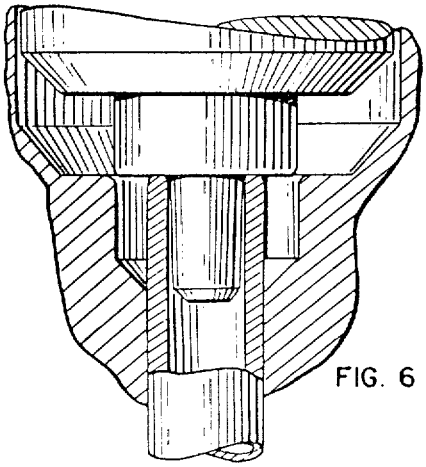
FIG. 6 is a fragmentary view partially in section illustrating a modified form of tool embodying the invention.

In the exemplary embodiment of the invention as disclosed in FIGS. 1-5 of the drawing, a tube flaring tool generally designated 10 is shown to comprise a U-shaped body 11 having a first leg 12, an opposite second leg 13, and a bight portion 14. Leg 13 is provided with a turned end 15 having a threaded bore 16 through which is threaded a threaded rod 17 carrying at its lower end a flaring head 18. Threading of the rod may be effected by a conventional handle 19 provided at the outer end of the rod.

A clamp block 20 is movably disposed in the space between legs 12 and 13 of body 11. A tube clamp generally designated 21 is provided for holding the end 22 of a tube T coaxially of the flaring head 18 and rod 17. In the illustrated embodiment, the tube clamp includes a half clamp portion 23 carried on the leg 12 and a half clamp portion 24 carried on the block 20. Flaring head 18 cooperates with the clamp portions 23 and 24 in the flaring operation to define in the tube end 22 a preselected partial double flare generally designated 25, as shown in FIG. 3.

Figure 5:
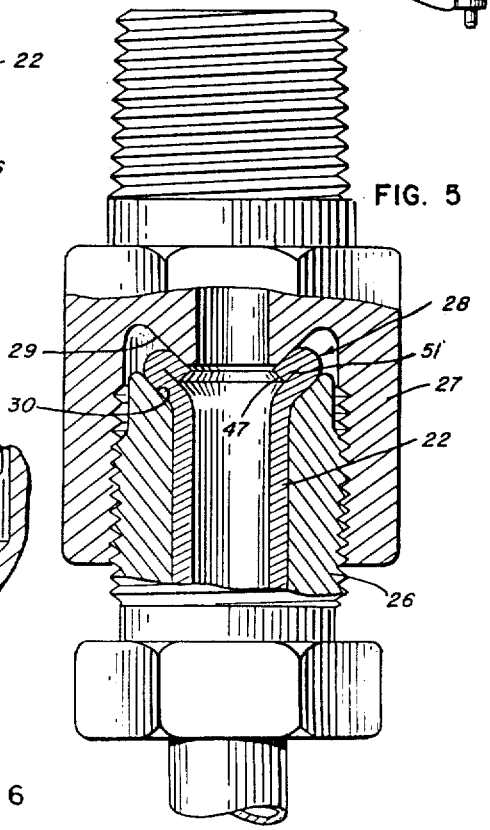
FIG. 5 is a fragmentary view similar to FIG. 4 but illustrating the arrangement of the fitting and tube end upon completion of the make-up of the fitting wherein the final double flare of the tube end is effected as an incident of the make-up of the fitting.

As shown in FIG. 4, the tube end 22, with partial double flare 25 formed therein, may be installed in the body 26 and nut member 27 of a conventional compression fitting so that upon completion of make-up of the fitting, as shown in FIG. 5, the partial double flare 25 is converted into a completed double flare generally designated 28 providing improved positive sealing connection of the tube end 22 to the fitting. More specifically, as shown in FIG. 5 of the drawing, the nut 27 includes a frustoconical sealing surface 29 and the body 26 includes a frustoconical sealing surface 20 between which the double wall flare is clamped in the made-up arrangement of the fitting. The partial flare 25 is suitably arranged so as to permit facilitated completion of the formation of the double flare 28 as an incident of the make-up of the fitting.

Referring now more specifically to FIGS. 2 and 3 of the drawing, flaring head 18 includes a base portion 31 defining a lower stop surface generally designated 32 including a planar distal portion 33 and a circumferential frustoconical portion 34.

The head further is provided with a depending flaring portion 35 projecting inwardly coaxially from base portion 31 and defining an inner frustoconical flaring surface 36 widening downwardly, or inwardly, as shown in FIG. 2. Projecting further inwardly from the center of the frustoconical portion 36 is a pilot portion 37 adapted to be received within a bore 38 of the tube end 22 and thereby guiding the flaring head 18 during the partial double flare forming operation.

As further shown in FIG. 2, the flaring portion 35 is right circularly cylindrical in the illustrated embodiment, and is received during the partial double flare forming operation in a recess generally designed 39 in tube clamp 21.

More specifically, the recess 39 includes an outer right circularly cylindrical portion 40 receiving the complementary flaring portion 35 of the flaring head. Inwardly of portion 40, the recess defines an inner frustoconical outwardly widening portion 41. Extending inwardly from the narrow inner end of frustoconical portion 41, the recess is defined by a cylindrical portion 42 having a diameter preselected to provide clamping of the tube end 22 when the half clamp portions 23 and 24 are brought together forcibly about the tube end 22.

As further shown in FIG. 2, recess 39 includes an outer enlarged portion 43 defined by a planar surface 44 into which recess portion 40 outwardly opens, a frustoconical outwardly widening portion 45, and an outermost right circularly cylindrical portion 46. The diameter of portion 45 is slightly greater than the outer diameter of base portion 31 of flaring head 18 so as to permit the base portion to move downwardly therethrough. Downward, or inward, movement of the flaring head is limited by the abutment of head surface 33 with clamp surface 44, and head surface 34 with clamp surface 45 at the end of the forming operation, as shown in FIG. 3.

More specifically, as the flaring head 18 is moved downwardly into recess 39 during the forming of the partial double flare 25, the distal end 47 of the tube end 22 is captured at the outer end of the frustoconical flaring surface 36 of the flaring head. The downward movement therefore causes the tube end to buckle so as to define an inner, outwardly widening frustoconical portion 48 and an outwardly narrowing frustoconical portion 49. The outer diameter of the buckled partial flare 25 is controlled by the abutment of the folded midportion 50 of the partial flare 25 with the right circularly cylindrical surface 40 of recess 39. The angularity of portion 48 is controlled by the abutment thereof with surface 41 of recess 39 and the angularity of the outer partial double flare portion 49 is controlled by the outer diameter of the pilot portion 37 at the juncture thereof with flaring head surface 36. *As shown in FIG. 3, the distal end 47 of the tube facially abuts the frustoconical stop surface 36a which narrows axially inwardly to the pilot portion 37, the outer surface of tube portion 49 facially abuts the flaring head surface 36, and the tube portion 48 facially abuts recess surface 41 in the buckled, partially completed double flare configuration 25. As shown in FIG. 3, tube portion 49 extends substantially normally to the stop surface 36a in the buckled configuration, as a result of the extension of surface 36a substantially perpendicularly to flaring surface 36.*

More specifically, in the illustrated embodiment, the backup surface 41 extends at a frustoconical angle of approximately 45° to the axis of the cylindrical recess. The frustoconical flaring surface 36 extends at an angle of approximately 60° to the axis of the flaring head. The stop surface 45 extends at a frustoconical angle of approximately 45° to the axis of the recess 39.

As further shown in FIG. 2, the pilot portion 37 may have a slight inwardly narrowing taper to facilitate insertion thereof into the tube end.

As shown in FIG. 5, the outer portion 51 of the completed double flare has a length such that the distal portion 47 of the tube end has an innermost diameter approximately equal to that of the normal inner diameter of the tube bore. The provision of the outer portion 51 to have such length is obtained by suitably sizing the diameter of recess portion 40 in coordination with the presented angularity of surface 36 and surface 41.

The angularity of surfaces 36 and 41 is further preselected so as to permit facilitated deformation of the tube end by buckling by means of the manual threading operation in the manually operable tool. Thus, the angularity of these surfaces is preselected to permit facilitated controlled buckling of the tube end by manually applied forces. Additionally, the angularity of these surfaces is preselected to permit facilitated completion of the double flare formation by the fitting elements while yet providing a sufficiently partially formed double flare to assure the final disposition of the flare portions in the configuration shown in FIG. 5.

Not only does the recess surface 40 provide a positive control on the outer diameter on the partial double flare and coordinated control with the surfaces 36 and 41 of the angularity of the partially completed double flare 25, but also the abutment of the partial flare portion 50 therewith effectively maintains desired concentricity of the flared end relative to the axis of the tube end.

Figure 7:
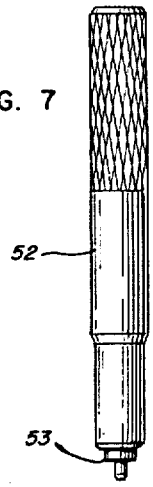
FIG. 7 is a side elevation of a further modified form of tool embodying the invention.

As will be obvious to those skilled in the art, the force applying means may not only comprise the threaded carrier rod 17, as shown in FIG. 1, but the improved partial double flare formation may similarly be effected by means of a punchtype force applying means, such as punch 52, as shown in FIG. 7. The punch may be provided with a flaring head portion 53 generally similar to flaring head portion 18 of tool 10, and may cooperate with a clamping means similar to the clamping means of tool 10 to provide the desired partial double flare 25 for completion in the fitting, as illustrated in FIGS. 4 and 5.

The invention further comprehends the provision of the clamping means as a means for selectively providing the above discussed partial double flare, or a conventional single flare by simple reversal of the clamping means. Thus, referring more specifically to FIG. 8, the one half clamp half 54 and one half clamp half 55 are provided at the lower end of the clamping portion 42a with a frustoconical flaring surface 56 permitting the clamp to be reversed in supporting the tube end and therby permit flaring of the tube end clamped therein by a conventional single flare flaring head (not shown). By means of the modified clamping structure of FIG. 8, a further more universally adaptable tool is provided for providing selectively either double flare or single flare tube ends as desired.

The foregoing disclosure of specific embodiments of illustrative of the broad inventive concepts comprehended by the invention.

We claim:

[1. A manually operable tube flaring tool for providing a controlled buckling of the end of a deformable tube to form a partial double flare therein, said tool comprising: a flaring head defining a frustoconical flaring surface and a cylindrical pilot portion projecting axially from said flaring surface to be received in the tube end for guiding the flaring surface axially against the distal end of the tube, said flaring surface extending radially substantially the entire radial dimension of the flaring head radially outwardly of the pilot portion; a support for fixedly positioning said tube end coaxially adjacent said flaring surface, said support defining a cylindrical recess coaxially confronting said flaring surface and including an axially outer right circularly cylindrical portion having an inner diameter slightly greater than that of the large end of said flaring surface for slidably guiding the flaring head during a flaring operation, an axially inner frustoconical, outwardly widening portion opening coaxially into said outer portion and an axially innermost tube clamping right circularly cylindrical portion; force transmitting means for forcibly urging the flaring head axially inwardly against said distal end of the tube secured by said clamping portion, the angularity of said frustoconical portion being preselected to allow said tube end to buckle radially outwardly to have an axially inner portion abut said frustoconical portion of the support and an axially outer portion adjacent said distal end about said flaring surface of the flaring head, and stop means for positively limiting inward movement of the flaring head relative to said support for assuring an accurately preselected buckled partial double flare configuration of the tube end, said stop means including an annular, inwardly facing planar stop surface on said flaring head outwardly adajcent said flaring surface, and a complementary annular outwardly facing planar stop surface on said support outwardly adjacent said outer recess portion.]

[2. The tube flaring tool of claim 1 wherein said flaring surface comprises a planar surface perpendicular to the axis of said pilot portion.]

3. The tube flaring tool of claim [1] *16* wherein said head defines a radially outer cylindrical surface slidably receivable in said [outer portion of the support recess] *holding means*.

4. The tube flaring tool of claim [*1*] *16* wherein said [support] *holding means* include cooperating stop means for limiting the axially inward movement of the flaring surface against said distal end of the tube.

5. The tube flaring tool of claim [1] *19* wherein said inner frustoconical portion of the support recess extends at an angle of approximately 45° to the axis thereof.

6. The tube flaring tool of claim [1] *16* wherein said frustoconical flaring surface [widens inwardly coaxially toward said support recess] *extends* at an angle of approximately 60° to the axis thereof.

7. The tube flaring tool of claim [1] *19* wherein the diameter of said outer cylindrical portion of the support recess is preselected to allow a midportion of said tube end to abut said surface when said tube end is buckled to have said inner portion abut said frustoconical portion and said outer portion to abut said flaring surface.

[8. The tube flaring tool of claim 1 wherein said force transmitting means comprises threaded means for advancing said head against said tube end as an incident of manual threaded rotation thereof.]

[9. The tube flaring tool of claim 1 wherein said force transmitting means comprises a punch carrying said head at one end and defining a striking surface at an opposite end.]

10. The tube flaring tool of claim [1] *16* wherein said pilot portion is tapered inwardly for facilitated insertion into said tube end.

[11. The tube flaring tool in claim 1 wherein said head defines a radially outer cylindrical surface having a diameter approximately 0.01 inch smaller than the diameter of said outer portion of the support recess whereby the head is freely slidably receivable in said outer portion of the support recess.]

12. The tube flaring tool of claim [1] *21* wherein said [head and support include cooperating] stop means [for limiting] *limits* the axially inward movement of the flaring surface against said distal end of the tube to cause the buckled tube end to have an accurately preselected axial length.

13. The tube flaring tool of claim [1] *21* wherein said stop means further comprise radially outer complementary frustoconical outwardly widening guide surfaces on said flaring head and support extending outwardly from said planar stop surfaces.

14. The tube flaring tool of claim [1] *19* wherein said support comprises a U-shaped carrier having one leg provided with fixed means defining one half of said recess, a movable clamp member provided with means defining the other half of said recess, and threaded means threaded through the other leg for forcibly urging said clamp member toward said one leg to clamp the tube end therebetween in the recess defined by the juxtaposition of said half recesses.

15. The tube flaring tool of claim [1] *19* wherein said support further defines a frustoconical recess opposite said cylindrical recess for use in selectively providing a single flare on a tube end.

*16. Pressing structure for providing a controlled buckling of the end of a deformable tube to form a partial double flare therein, comprising*

*tool means defining holding means for holding the tube end, and a flaring head defining a frustoconical axially inwardly widening flaring surface, a frustoconical axially inwardly narrowing stop surface extending from the radially inner end of the flaring surface, and a pilot portion projecting coaxially inwardly from the radially inner end of the stop surface to be received in the tube end for guiding the stop and flaring surfaces into facial engagement with the tube end to cause said tube end to buckle radially outwardly and cause the distal end of the tube end to abut said stop surface with the axially outer portion of the buckled tube end extending frustoconically substantially normally to said stop surface as an incident of the flaring head being forced coaxially against said tube end.*

*17. The pressing structure of claim 16 wherein said flaring head stop surface extends substantially perpendicularly to said flaring surface.*

*18. A system for providing a controlled buckling of the end of a deformable tube to form a double flare therein, comprising:*

*tool means defining holding means for holding the tube end, and a flaring head defining a frustoconical axially inwardly widening flaring surface, a frustoconical axially inwardly narrowing stop surface extending from the radially inner end of the flaring surface, and a pilot portion projecting coaxially inwardly from the radially inner end of the stop surface to be received in the tube end for guiding the stop and flaring surfaces into facial engagement with the tube end to cause said tube end to buckle radially outwardly and cause the distal end of the tube end to abut said stop surface with the axially outer portion of the buckled tube end extending frustoconically substantially normally to said stop surface as an incident of the flaring head being forced coaxially against said tube end; and*

*tube fitting means defining a frustoconical axially outwardly widening compression surface terminating in an annular axially inner planar surface, and an axial bore opening through said annular surface and having a diameter substantially equal to the inner diameter of said tube end, the outer diameter of said frustoconical stop surface being less than the outer diameter of said annular planar surface.*

*19. A system for providing a controlled buckling of the end of a deformable tube to form a double flare therein, comprising:*

*tool means defining holder means for holding the tube end, and a flaring head defining a frustoconical axially inwardly widening flaring surface, a frustoconical axially inwardly narrowing stop surface extending from the radially inner end of the flaring surface, and a pilot portion projecting coaxially inwardly from the radially inner edn of the stop surface to be received in the tube end for guiding the stop and flaring surfaces into facial engagement with the tube end to cause said tube end to buckle radially outwardly in a partial double flare configuration with the distal end of the tube end abutting said stop surface and with the axially outer portion of the buckled tube end extending frustoconically substantially normally to said stop surface as an incident of the flaring head being forced coaxially against said tube end; and*

*tube fitting means defining a frustoconical axially outwardly widening compression surface terminating in an annular axially inner planar surface, and an axial bore opening through said annular surface and having a diameter substantially equal to the inner diameter of said tube end, the outer diameter of said frustoconical stop surface being less than the outer diameter of said annular planar surface, said holding means comprising a support defining a recess coaxially confronting said flaring surface of the flaring head and including an axially outer right circularly cylindrical portion having an inner diameter slightly greater than that of the large end of said flaring surface and slidably guiding the flaring head during a flaring operation, an axially inner frustoconical, axially outwardly widening portion opening coaxially into said recess outer portion, and an axially innermost tube clamping right circularly cylindrical portion.*

*20. The system of claim 19 wherein said axially inner, frustoconical outwardly widening portion of the support recess extends substantially perpendicularly to the frustoconical flaring surface whereby said buckled tube end includes substantially perpendicular axially inward and outward buckled portions in facial abutment therewith upon completion of the partial flaring operation.*

*21. A system for providing a controlled buckling of the end of a deformable tube to form a double flare therein, comprising:*

*tool means defining holding means for holding the tube end, and a flaring head defining a frustoconical axially inwardly widening flaring surface, a frustoconical axially inwardly narrowing stop surface extending from the radially inner end of the flaring surface, and a pilot portion projecting coaxially inwardly from the radially inner end of the stop surface to be received in the tube end for guiding the stop and flaring surfaces into facial engagement with the tube end to cause said tube end to buckle radially outwardly and cause the distal end of the tube end to abut said stop surface with the axially outer portion of the buckled tube end extending frustoconically substantially normally to said stop surface as an incident of the flaring head being forced coaxially against said tube end;*

*tube fitting means defining a frustoconical axially outwardly widening compression surface terminating in an annular axially inner planar surface, and an axial bore opening through said annular surface and having a diameter substantially equal to the inner diameter of said tube end, the outer diameter of said frustoconical stop surface being less than the outer diameter of said annular planar surface, said holding means comprising a support defining a recess coaxially confronting said flaring surface of the flaring head and including an axially outer right circularly cylindrical portion*

*having an inner diameter slightly greater than that of the large end of said flaring surface and slidably guiding the flaring head during a flaring operation, an axially inner frustoconical, axially outwardly widening portion opening coaxially into said recess outer portion, and an axially innermost tube clamping right circularly cylindrical portion; and*

*stop means for positively limiting inward movement of the flaring head relative to said support for assuring an accurately preselected buckled partial double flare configuration of the tube end, said stop means including an annular inwardly facing planar stop surface on said flaring head axially and radially outwardly of said flaring surface, and a complementary annular outwardly facing planar stop surface on said support at the axially outer end of said cylindrical outer recess portion.*

*22. The system of claim 21 wherein said axially inner frustoconical outwardly widening portion of the support recess extends substantially perpendicularly to the frustoconical flaring surface whereby said buckled tube end includes substantially perpendicular axially inward and outward buckled portions.*

* * * * *